United States Patent
Ichikawa

(10) Patent No.: US 11,325,489 B2
(45) Date of Patent: May 10, 2022

(54) POWER CONVERSION APPARATUS

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 131 days.

(21) Appl. No.: 16/674,396

(22) Filed: Nov. 5, 2019

(65) Prior Publication Data
US 2020/0139831 A1 May 7, 2020

(30) Foreign Application Priority Data
Nov. 7, 2018 (JP) .............................. JP2018-209578

(51) Int. Cl.
| | |
|---|---|
| *H02J 7/04* | (2006.01) |
| *B60L 53/18* | (2019.01) |
| *B60L 53/10* | (2019.01) |
| *B60L 53/16* | (2019.01) |
| *H02M 7/217* | (2006.01) |
| *H01R 13/66* | (2006.01) |

(52) U.S. Cl.
CPC .............. *B60L 53/18* (2019.02); *B60L 53/11* (2019.02); *B60L 53/16* (2019.02); *H01R 13/6675* (2013.01); *H02M 7/217* (2013.01); *B60L 2210/30* (2013.01); *B60L 2210/40* (2013.01)

(58) Field of Classification Search
USPC ................ 320/107, 108, 135, 136, 137, 138
See application file for complete search history.

(56) References Cited

U.S. PATENT DOCUMENTS

| | | | |
|---|---|---|---|
| 2013/0082655 A1* | 4/2013 | Kamishima | B60L 50/16 320/109 |
| 2013/0088200 A1* | 4/2013 | Kamishima | H01M 10/44 320/109 |
| 2014/0002024 A1 | 1/2014 | Ang et al. | |
| 2015/0217656 A1* | 8/2015 | Loftus | B60L 53/16 320/136 |
| 2015/0372519 A1 | 12/2015 | Abe et al. | |
| 2016/0036256 A1 | 2/2016 | Sukup et al. | |
| 2020/0122597 A1* | 4/2020 | Ichikawa | B60H 1/00971 |
| 2020/0130520 A1* | 4/2020 | Ichikawa | B60L 53/16 |
| 2020/0130521 A1* | 4/2020 | Ichikawa | H02M 1/4225 |
| 2020/0139831 A1* | 5/2020 | Ichikawa | B60L 53/11 |

FOREIGN PATENT DOCUMENTS

| | | | |
|---|---|---|---|
| JP | 2002084673 A | * | 3/2002 |
| JP | 2014-075853 A | | 4/2014 |
| JP | 2014183723 A | * | 9/2014 |
| JP | 2014-193089 A | | 10/2014 |
| JP | 2016-005399 A | | 1/2016 |
| JP | 2016-521106 A | | 7/2016 |
| KR | 20180110531 A | * | 10/2018 |
| WO | 2012127648 A1 | | 9/2012 |

* cited by examiner

*Primary Examiner* — Brian Ngo
(74) *Attorney, Agent, or Firm* — Dinsmore & Shohl LLP

(57) ABSTRACT

A power conversion apparatus includes a housing including an AC inlet and a DC connector. The DC connector is connectable to an inlet for DC power of a vehicle. The AC inlet is connectable to a connector of a cable for AC power. A rectifier circuit is housed in the housing. The rectifier circuit is located between the AC inlet and the DC connector, and configured to convert AC power input from the AC inlet side into DC power and output the DC power to the DC connector side.

8 Claims, 13 Drawing Sheets

POWER CONVERSION APPARATUS

CROSS REFERENCE TO RELATED APPLICATIONS

This nonprovisional application claims priority to Japanese Patent Application No. 2018-209578 filed on Nov. 7, 2018 with the Japan Patent Office, the entire contents of which are hereby incorporated by reference.

BACKGROUND

Field

The present disclosure relates to a power conversion apparatus.

Description of the Background Art

In recent years, from the perspective of environmental conservation, electrically powered vehicles (e.g., electric vehicles or plug-in hybrid vehicles) powered mainly by electric power tend to increase. Such vehicles include an inlet configured to receive electric power supplied from a power feeding facility, and charge a vehicle-mounted battery with the electric power received by the inlet. When a connector of a charging cable of the power feeding facility is connected to the inlet of the vehicle, electric power can be supplied from the power feeding facility through the charging cable to the inlet of the vehicle.

An AC power supply method (hereinafter, also referred to as "AC method") and a DC power supply method (hereinafter, also referred to as "DC method") are known as main power feeding methods. A normal charger and a quick charger are known as main power feeding facilities. The AC method is used in the normal charger, and the DC method is used in the quick charger.

The DC method is further divided into a plurality of types of emerging DC methods such as a CHAdeMO method, a CCS (Combined Charging System) method, a GB/T method, and a Tesla method. These DC methods do not necessarily have a unified charging protocol. Therefore, Japanese National Patent Publication No. 2016-521106 proposes an inter-protocol adapter (CHAdeMO/Tesla adapter) attached to a cable for DC power (hereinafter, also referred to as "DC cable") of a quick charger.

SUMMARY

In a normal charger, a cable for AC power (hereinafter, also referred to as "AC cable") is used. When a connector of the AC cable connected to the normal charger is connected to an inlet for AC power (hereinafter, also referred to as "AC inlet") of a vehicle, AC power can be supplied from the normal charger to the AC inlet of the vehicle through the AC cable. Generally, the normal charger is considered to be a power feeding facility for a vehicle including an AC inlet. Therefore, in the case of a vehicle not including an AC inlet, charging of a vehicle-mounted battery by a normal charger is difficult. However, the widespread use of a vehicle including only an inlet for DC power (hereinafter, also referred to as "DC inlet") is expected in the future. Hereinafter, a vehicle including only a DC inlet will be referred to as "DC dedicated vehicle". In such a case, if a normal charger cannot be used in a DC dedicated vehicle, the convenience of a user of the DC dedicated vehicle is not only lost, but the effective use of the existing normal charger (charging infrastructure) may become impossible.

The present disclosure has been made to solve the above-described problem, and an object of the present disclosure is to provide a power conversion apparatus having high durability and configured to allow a vehicle including only a DC inlet to be supplied with electric power from a power feeding facility for the AC method.

A power conversion apparatus according to the present disclosure includes: a housing including a DC connector and an AC inlet; and a first power conversion circuit housed in the housing. The DC connector is connectable to an inlet for DC power of a vehicle. The AC inlet is connectable to a connector of a cable for AC power. The first power conversion circuit is located between the AC inlet and the DC connector, and configured to convert AC power input from the AC inlet side into DC power and output the DC power to the DC connector side.

By using the power conversion apparatus, the AC power supplied from a power feeding facility for the AC method can be converted into the DC power and the DC power can be supplied to the vehicle. Therefore, according to the power conversion apparatus, a vehicle including only a DC inlet can be supplied with electric power from a power feeding facility for the AC method. Furthermore, the DC connector, the AC inlet and the first power conversion circuit are provided in the single housing, and thus, the DC connector, the AC inlet and the first power conversion circuit are integrated. As a result, the durability of the power conversion apparatus is enhanced.

For example, if the first power conversion circuit and the DC connector are provided in separate housings and the housing of the first power conversion circuit is connected to the housing of the DC connector through a flexible cable, stress is likely to be applied to the flexible cable due to a weight of the first power conversion circuit. In addition, torsion is likely to occur in such flexible cable. Furthermore, if the housing of the first power conversion circuit is placed on the ground in order to receive the weight of the first power conversion circuit at the ground, submersion of the first power conversion circuit in water is likely to occur.

In contrast, in the power conversion apparatus, the DC connector, the AC inlet and the first power conversion circuit are integrated, and thus, by connecting the DC connector of the power conversion apparatus to the DC inlet of the vehicle, the power conversion apparatus as a whole can be supported by the vehicle. Therefore, the stress is reduced as compared with the above-described case in which the flexible cable is used, and thus, the durability of the power conversion apparatus is enhanced. In addition, such power conversion apparatus is easily held at a position higher than the ground, and thus, submersion of the power conversion apparatus in water is easily avoided.

The power conversion apparatus may be configured such that the AC inlet is located below the DC connector and above a ground contact surface of the vehicle, when the DC connector is connected to the inlet for DC power of the vehicle.

In the power conversion apparatus, the AC inlet is located below the DC connector, and thus, the connector of the AC cable is easily connected to the AC inlet. This is because the AC cable is often used in a state of being routed on the ground. In addition, in the power conversion apparatus, the DC connector and the AC inlet are located above the ground contact surface of the vehicle, and thus, submersion of the power conversion apparatus in water is easily avoided.

The power conversion apparatus may be configured such that a connection surface of the AC inlet is inclined with respect to a fitting surface between the DC connector and the inlet for DC power, when the DC connector is fitted into the inlet for DC power. With such a configuration, a user can easily see the connection surface of the AC inlet.

The housing (i.e., the housing in which the DC connector, the AC inlet and the first power conversion circuit are integrated) of the power conversion apparatus may be configured to be supported by the vehicle in a state of floating from a ground, when the DC connector is connected to the inlet for DC power.

Since the power conversion apparatus is configured to be supportable only by the vehicle, the power conversion apparatus can be used without being placed on the ground. Therefore, submersion of the power conversion apparatus in water is easily avoided.

In the power conversion apparatus, an end of the housing on the AC inlet side may include a skirt portion protruding around a connection surface of the AC inlet.

Since the skirt portion is provided around the connection surface of the AC inlet, the connection surface of the AC inlet is not easily affected by rain, snow and wind (and further, a foreign object blown by the wind).

The housing of the power conversion apparatus may include a roof member for a connection surface of the AC inlet. Such roof member can function as a protection against rain. By providing the roof member, the connection surface of the AC inlet is not easily wetted with rain. The skirt portion may function as the roof member.

An insulating circuit and an interrupter described below may be further housed in the housing. The insulating circuit is located between the AC inlet and the DC connector. The interrupter is configured to interrupt a current between the AC inlet and the DC connector, when the interrupter detects an abnormality of the current between the AC inlet and the DC connector.

According to the above-described configuration, the current is interrupted by the interrupter when the abnormality of the current (e.g., electric leakage or overcurrent) occurs, and thus, a circuit on the power reception side can be protected.

In the power conversion apparatus, the first power conversion circuit may be located on the DC connector side relative to the insulating circuit. The interrupter may include: a first switch configured to switch conduction and cut-off of a current between the insulating circuit and the DC connector; a first current sensor configured to detect a current flowing between the first power conversion circuit and the DC connector; and a first controller configured to control the first switch. The first controller may be configured to bring the first switch into an open state to thereby cut off the current, when the abnormality of the current is detected by the first current sensor while electric power is being input to the AC inlet.

In the power conversion apparatus, a circuit on the AC inlet side and a circuit on the DC connector side are electrically insulated by the insulating circuit. Therefore, even when an overcurrent occurs in the circuit on the AC inlet side relative to the insulating circuit, the overcurrent does not flow into the circuit on the DC connector side relative to the insulating circuit. In addition, the first controller of the interrupter brings the first switch into the open state to thereby cut off the current, when the abnormality of the current is detected by the first current sensor while the electric power is being input to the AC inlet. Therefore, according to the interrupter, when the abnormality of the current occurs while the electric power is being input to the AC inlet (e.g., while the electric power is being supplied from the power feeding facility for the AC method through the power conversion apparatus to the vehicle), the circuit on the power reception side (e.g., the electronic circuit of the vehicle) can be appropriately protected.

A second power conversion circuit configured to perform prescribed power conversion may be further housed in the housing. The second power conversion circuit may be located between the AC inlet and the insulating circuit. The interrupter may include: a second switch configured to switch conduction and cut-off of a current between the AC inlet and the insulating circuit; a second current sensor configured to detect a current flowing between the second power conversion circuit and the AC inlet; and a second controller configured to control the second switch. The second controller may be configured to bring the second switch into an open state to thereby cut off the current, when the abnormality of the current is detected by the second current sensor while electric power is being input to the DC connector.

In the power conversion apparatus, the circuit on the AC inlet side and the circuit on the DC connector side are electrically insulated by the insulating circuit. Therefore, even when an overcurrent occurs in the circuit on the DC connector side relative to the insulating circuit, the overcurrent does not flow into the circuit on the AC inlet side relative to the insulating circuit. In addition, the second controller of the interrupter brings the second switch into the open state to thereby cut off the current, when the abnormality of the current is detected by the second current sensor while the electric power is being input to the DC connector. Therefore, according to the interrupter, when the abnormality of the current occurs while the electric power is being input to the DC connector (e.g., while the electric power is being supplied from the vehicle through the power conversion apparatus to the outside of the vehicle), the circuit on the power reception side (e.g., an electrical load external to the vehicle that receives power feeding from the vehicle) can be appropriately protected.

In the interrupter including the first switch, the second switch, the first controller configured to control the first switch, and the second controller configured to control the second switch, the first controller configured to control the first switch and the second controller configured to control the second switch may be two separate control units, or may be a common control unit (i.e., a single control unit configured to control the first switch and the second switch).

The first power conversion circuit may be configured to convert DC power input from the DC connector side into AC power and output the AC power to the AC inlet side.

The first power conversion circuit can perform bidirectional power conversion. According to the power conversion apparatus including the above-described first power conversion circuit, the DC power can be not only supplied from the power feeding facility for the AC method through the power conversion apparatus to the vehicle, but the AC power can be supplied from the vehicle through the power conversion apparatus to the outside of the vehicle.

The foregoing and other objects, features, aspects and advantages of the present disclosure will become more apparent from the following detailed description of the present disclosure when taken in conjunction with the accompanying drawings.

DETAILED DESCRIPTION

Figure 1:
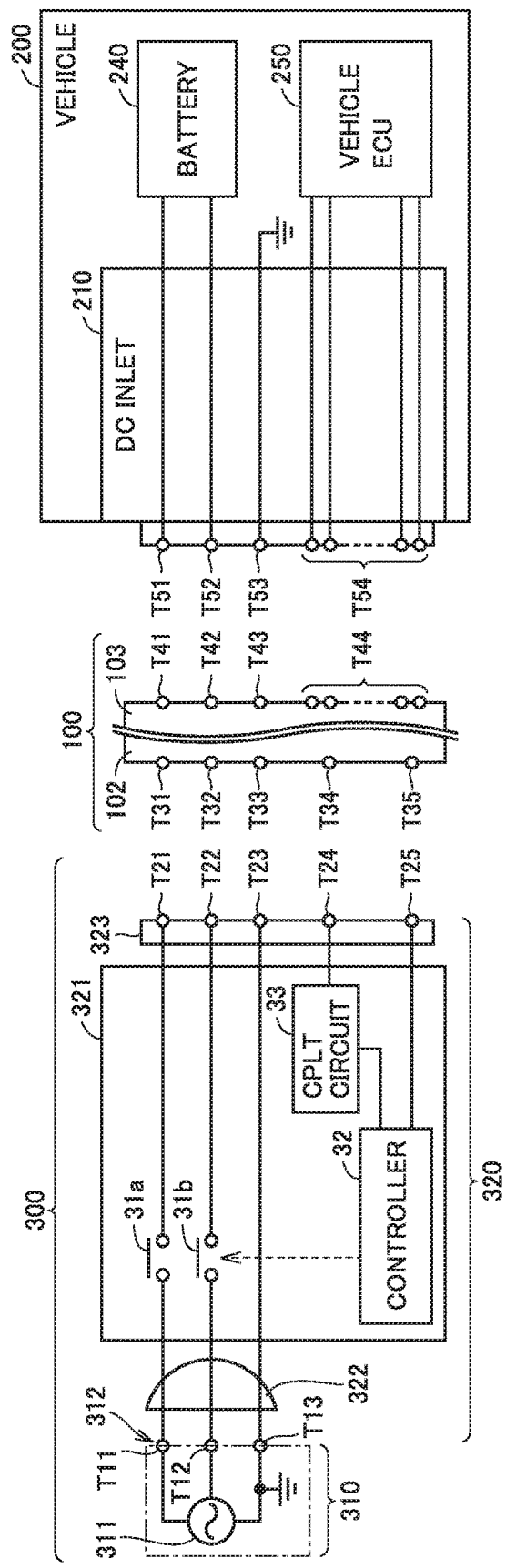
FIG. 1 is an overall configuration diagram of a power feeding system according to a first embodiment of the present disclosure.

Embodiments of the present disclosure will be described in detail with reference to the drawings, in which the same or corresponding portions are denoted by the same reference characters and description thereof will not be repeated. Hereinafter, an electronic control unit will be referred to as "ECU".

First Embodiment

FIG. 1 is an overall configuration diagram of a power feeding system according to a first embodiment of the present disclosure. Referring to FIG. 1, the power feeding system according to the present embodiment includes a power conversion apparatus 100, a vehicle 200 and a power feeding facility 300. Power conversion apparatus 100 is configured to perform power conversion between vehicle 200 and power feeding facility 300.

Vehicle 200 is a DC dedicated vehicle. That is, vehicle 200 does not include an AC inlet. Vehicle 200 includes an inlet for DC power (DC inlet) 210, a battery 240 (vehicle-mounted battery) and a vehicle ECU 250. DC inlet 210 has terminals T51 to T53 and a terminal group T54. Terminals T51 and T52 are power terminals and terminal 153 is a ground terminal. Terminal group T54 includes a plurality of signal terminals. Each signal terminal included in terminal group T54 is connected to vehicle ECU 250 through a signal line.

Electric power of an external power supply (e.g., a system power supply 311) is input to terminals T51 and T52 of DC inlet 210 through power conversion apparatus 100. The electric power input to DC inlet 210 is supplied to battery 240. DC inlet 210 further includes a circuit (e.g., a not-shown filter circuit) configured to perform a prescribed process on the input electric power). As a result of the process performed by the circuit, the electric power suitable for charging of battery 240 is output from DC inlet 210 to battery 240. Vehicle 200 may be an electric vehicle that can travel using only electric power stored in battery 240, or may be a hybrid vehicle that can travel using both electric power stored in battery 240 and an output of an engine (not shown).

Power feeding facility 300 is a power feeding facility for the AC method. Power feeding facility 300 includes a power supply device 310 and a charging cable 320. Power supply device 310 includes system power supply 311 and an electrical outlet 312. System power supply 311 is an AC power supply (e.g., a single-phase AC power supply having a voltage of 100 V or 200 V) supplied with electric power from a power grid (e.g., a power grid provided by a power company). System power supply 311 is connected to electrical outlet 312 with a not-shown wiring breaker being interposed. The wiring breaker is configured to interrupt an electric power path when an abnormal current flows due to overload, a short circuit or any other factor, and forcibly stop electric power supply from system power supply 311 to electrical outlet 312 (and further, charging cable 320). Power supply device 310 may be a normal charger of an electrical outlet type. Electrical outlet 312 may be an electrical outlet (e.g., an outdoor electrical outlet box) provided on an outer wall of a house.

Figure 2:
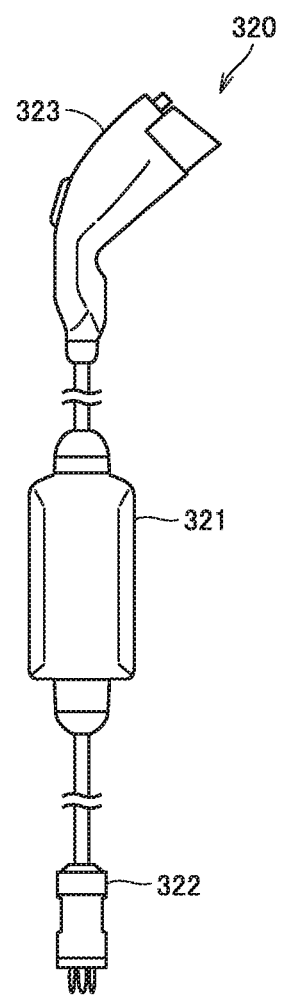
FIG. 2 shows an appearance of a charging cable used in the power feeding system shown in FIG. 1.

Charging cable 320 is a cable for AC power (AC cable) and is, for example, a general charging cable used in power feeding in accordance with the AC method. FIG. 2 shows an appearance of charging cable 320. Referring to FIG. 2, charging cable 320 includes a CCID (Charging Circuit Interrupt Device) box 321, a plug 322 and an AC connector 323.

Referring again to FIG. 1, plug 322 has terminals T11 to T13. When plug 322 is connected to (e.g., inserted into) electrical outlet 312 (plug receptacle), terminals T11, T12 and T13 of plug 322 are electrically connected to a hot end, a cold end and a ground of system power supply 311, respectively.

Relays 31a and 31b, a controller 32 configured to control relays 31a and 31b, and a CPLT circuit 33 are built into CCID box 321. AC connector 323 has terminals T21 to T25. Terminals T21, 122 and T23 are connected to terminals T11, T12 and T13 through electric lines, respectively. However, a relay 31a is provided in the electric line connecting terminal T11 and terminal T21, and a relay 31b is provided in the electric line connecting terminal T12 and terminal T22. The electric line connecting terminal TI 3 and terminal T23 corresponds to a ground line and terminal T23 corresponds to a ground terminal. CPLT circuit 33 is connected to terminal T24 through a signal line. The signal line connecting CPLT circuit 33 and terminal T24 corresponds to a PISW signal line and terminal T24 corresponds to a PISW signal terminal. In addition, controller 32 is connected to terminal T25 through a signal line. The signal line connecting controller 32 and terminal T25 corresponds to a CPLT signal line and terminal T25 corresponds to a CPLT signal terminal. A CPLT signal (control pilot signal) and a PISW signal (cable connection signal) are signals in accordance with the standards of "SAE Electric Vehicle Conductive Charge Coupler".

Controller 32 is configured to communicate with another controller (e.g., a controller of power conversion apparatus 100) in accordance with the CPLT signal, in a state where AC connector 323 is connected to an AC inlet (e.g., an AC inlet 102 of power conversion apparatus 100). For example, using the CPLT signal, controller 32 can provide information about charging, such as a connection state of charging cable 320 and a current capacity of charging cable 320. In addition, using the CPLT signal, controller 32 can receive information about charging (e.g., a notification indicating whether or not electric power supply is possible) from the other controller. Controller 32 initially sets relays 31a and 31b in an open state (cut-off state). When electric power supply is permitted, controller 32 brings relays 31a and 31b into a closed state (conducting state).

CPLT circuit 33 is configured such that an impedance of a signal path varies between a state in which AC connector 323 is connected to the AC inlet (e.g., the AC inlet of power conversion apparatus 100) and a state in which AC connector 323 is not connected to the AC inlet. CPLT circuit 33 outputs the PISW signal (i.e., a signal indicating whether or not charging cable 320 is connected) generated using such variation in impedance to controller 32. Controller 32 can determine a connection state (connection/disconnection) of charging cable 320 based on the PISW signal input from CPLT circuit 33.

Figure 3:
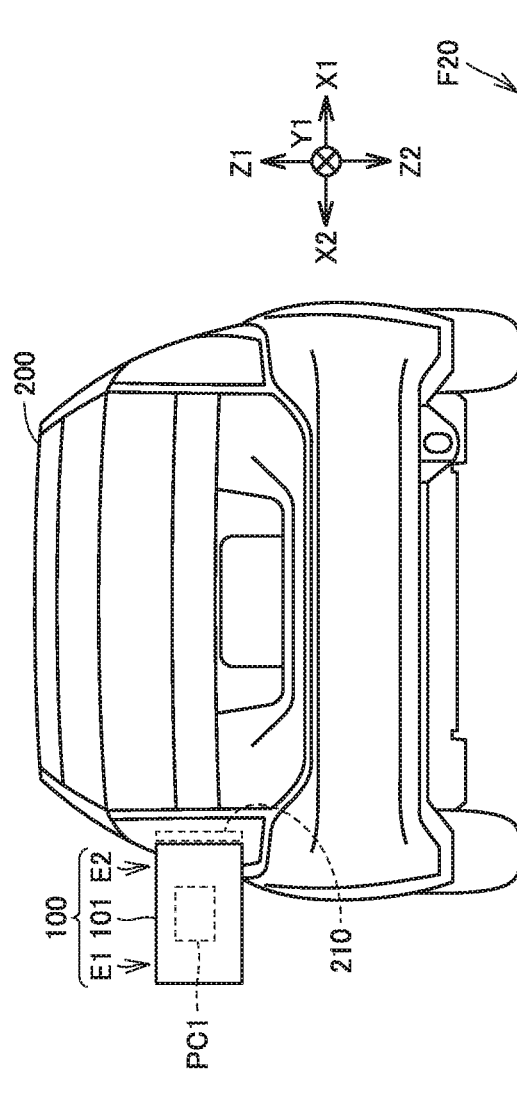
FIG. 3 shows a state in which a power conversion apparatus according to the first embodiment of the present disclosure is connected to a vehicle.
Figure 4:
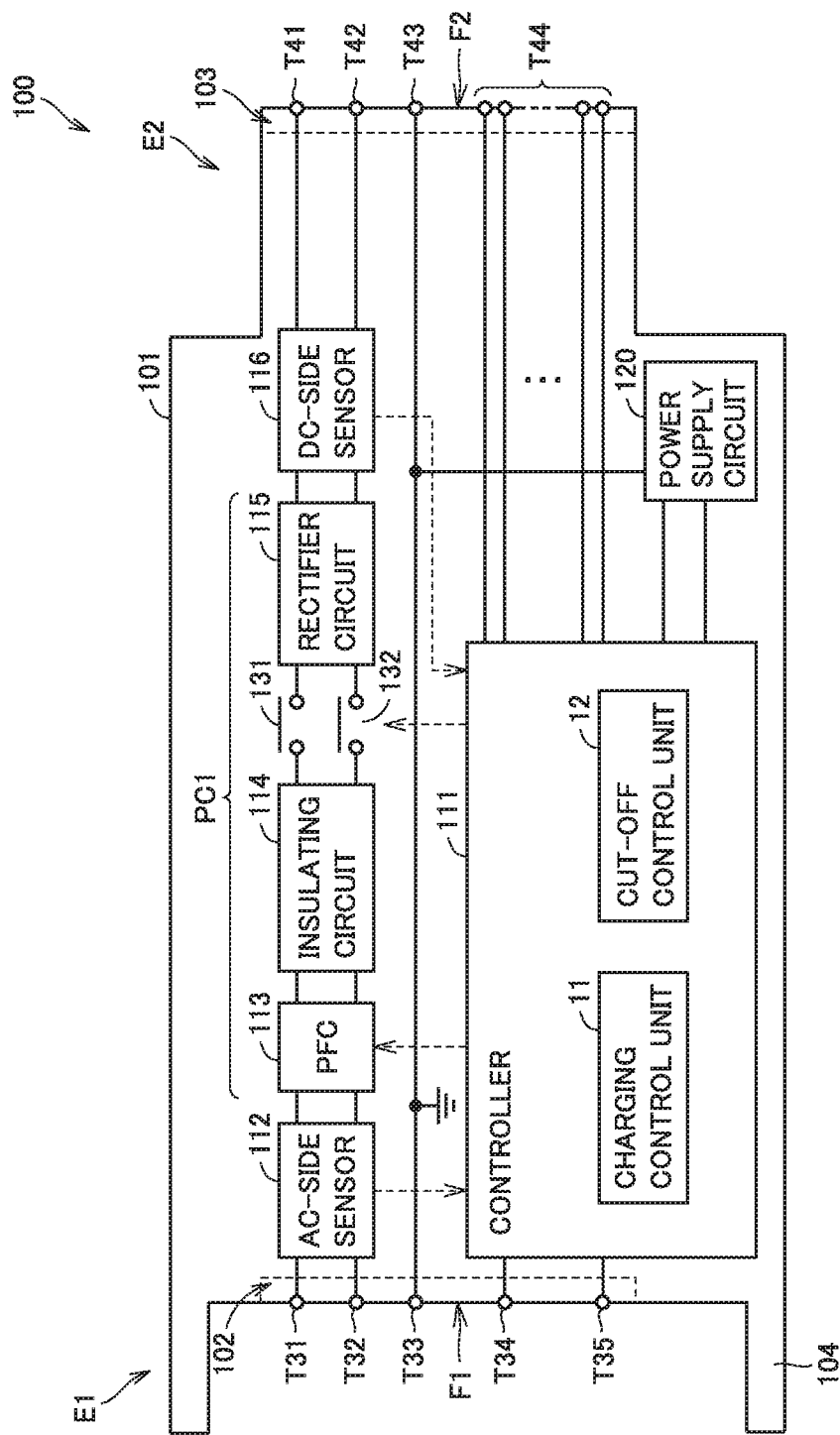
FIG. 4 shows a schematic external shape of a housing and a configuration (internal configuration) of the interior of the housing, of the power conversion apparatus according to the first embodiment of the present disclosure.

FIG. 3 shows a state in which power conversion apparatus 100 is connected to vehicle 200. FIG. 4 shows a schematic external shape of a housing and a configuration of the interior of the housing, of power conversion apparatus 100. In each figure used below, of an X axis, a Y axis and a Z axis orthogonal to one another, the Z axis indicates a vertical direction. In the Z axis, an arrow Z1 indicates a vertically upward direction, and an arrow Z2 indicates a vertically downward direction (direction of gravity). In the Y axis, an arrow Y1 indicates a vehicle front.

Referring to FIGS. 3 and 4, power conversion apparatus 100 includes a housing 101 including AC inlet 102 and a DC connector 103. Housing 101 has an elongated external shape, and has a first end E1 at one end and a second end E2 at the other end. More specifically, housing 101 has a cylindrical (e.g., circular cylindrical) body portion in which the X axis is a longitudinal direction, and first end E1 and second end E2 are located at opposing ends of the body portion. Housing 101 is made of, for example, resin, which has an insulating property. In some embodiments, resin having a high hardness, such as thermosetting resin or crosslinked resin, is used. However, the material of housing 101 is not limited to the resin, and metal (e.g., aluminum or an alloy thereof) can also be used.

AC inlet 102 is provided at first end E1 of housing 101 and is connectable to AC connector 323 of charging cable 320 (FIG. 1). DC connector 103 is provided at second end E2 of housing 101 and is connectable to DC inlet 210 of vehicle 200 (FIG. 1). At least one of AC inlet 102 and DC connector 103 may include a lock mechanism (e.g., a latch) for fixation in a connected state, and an operation device (e.g., an unlock lever or an ejector button) for unlocking. AC inlet 102 may include a lid or a cap configured to cover a connection surface F1 when not in use. DC connector 103 may include a cap configured to cover a connection surface F2 when not in use.

In the present embodiment, when DC connector 103 is connected to DC inlet 210, housing 101 of power conversion apparatus 100 is supported by vehicle 200. As shown in FIG. 3, housing 101 is supported by vehicle 200 and power conversion apparatus 100 as a whole is thereby supported only by vehicle 200. In a state where DC connector 103 of power conversion apparatus 100 is connected (e.g., fitted) to DC inlet 210 (hereinafter, also referred to as "DC connected state"), AC inlet 102 and DC connector 103 are located above (Z1 side) a ground contact surface (i.e., a ground surface F20) of vehicle 200. Power conversion apparatus 100 is supported by vehicle 200 in a state of floating from the ground. Therefore, even when ground surface F20 is wetted with rain or snow, submersion of power conversion apparatus 100 in water is less likely to occur.

Connection surfaces F1 and F2 shown in FIG. 4 are exposed at a surface of housing 101 such that external terminals can be connected to connection surfaces F1 and F2. In the DC connected state of power conversion apparatus 100 shown in FIG. 3, connection surface F1 of AC inlet 102 faces a direction of an arrow X2, and connection surface F2 of DC connector 103 faces a direction of an arrow X1. The direction indicated by arrow X1 corresponds to the vehicle 200 side when viewed from power conversion apparatus 100 in the DC connected state.

First end E1 of housing 101 on the AC inlet 102 side includes a skirt portion 104 protruding toward the tip side (i.e., the X2 side in the DC connected state shown in FIG. 3) around connection surface F1 of AC inlet 102. Connection surface F1 of AC inlet 102 is surrounded by skirt portion 104 (see FIG. 5 described below). A part of skirt portion 104 is located on the upper side (Z1 side) of connection surface F1 of AC inlet 102 and can function as a roof member for connection surface F1. Skirt portion 104 serves to protect connection surface F1 of AC inlet 102 from rain, snow and wind (and further, a foreign object blown by the wind).

With an internal configuration described below, power conversion apparatus 100 described above allows a vehicle including only a DC inlet (DC dedicated vehicle) to be supplied with electric power from a power feeding facility for the AC method.

Referring to FIG. 4, a controller 111, an AC-side sensor 112, a power conversion circuit PC1, a DC-side sensor 116, and a power supply circuit 120 are housed in housing 101 of power conversion apparatus 100. Power conversion circuit PC1 includes a power factor correction (PFC) circuit 113, an insulating circuit 114, a rectifier circuit 115, and cut-off switches 131 and 132. AC inlet 102 has terminals T31 to T35. DC connector 103 has terminals T41 to T43 and a terminal group T44.

Figure 5:
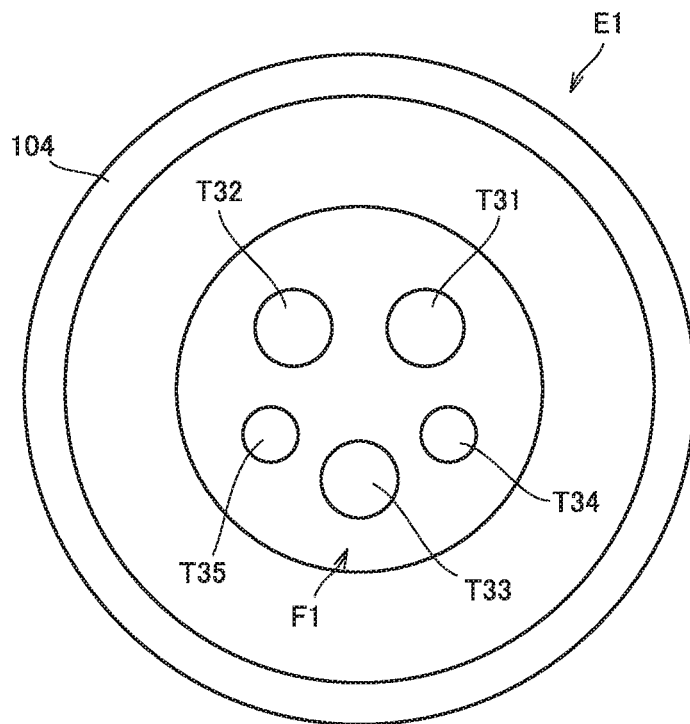
FIG. 5 shows a connection surface of an AC inlet at a first end of the housing of the power conversion apparatus shown in FIG. 4.

FIG. 5 shows connection surface F1 of AC inlet 102 at first end E1 of housing 101. Referring to FIG. 5 together with FIG. 4, terminals T31 and T32 of AC inlet 102 are power terminals (a HOT terminal/a COLD terminal) to which AC power is input. Terminal T33 is a ground terminal and is electrically connected to a ground line in housing 101. Terminal T34 is a PISW signal terminal and is connected to controller 111 through a PISW signal line in housing 101. Terminal T35 is a CPLT signal terminal and is connected to controller 111 through a CPLT signal line in housing 101. Connection surface F1 of AC inlet 102 is surrounded by skirt portion 104 of housing 101.

Referring to FIGS. 1 and 4, terminals T31 to T35 of AC inlet 102 correspond to terminals T21 to T25 of AC connector 323 of charging cable 320, respectively. In a state (fitted state) where AC inlet 102 is connected to AC connector 323, terminals T31 to T35 of AC inlet 102 are connected to terminals T21 to T25 of AC connector 323, respectively. When terminals T21 and T22 are electrically connected to terminals T31 and T32, AC power can be supplied from system power supply 311 through charging cable 320 to AC inlet 102. When terminal T23 is electrically connected to terminal T33, the ground line of charging cable 320 is electrically connected to the ground line in housing 101. When terminal T24 is electrically connected to terminal T34, the PISW signal output from CPLT circuit 33 of charging cable 320 is input to controller 111 of power conversion apparatus 100. When terminal T25 is electrically connected to terminal T35, communication can be performed between controller 32 of charging cable 320 and controller 111 of power conversion apparatus 100 in accordance with the CPLT signal. AC inlet 102 may have a circuit (not shown) configured to convert the PISW signal and the CPLT signal received from charging cable 320 such that controller 111 can process (or recognize) the PISW signal and the CPLT signal.

Figure 6:
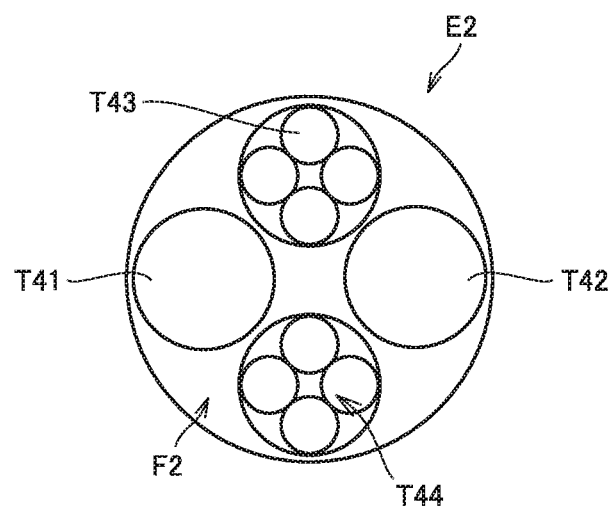
FIG. 6 shows a connection surface of a DC connector at a second end of the housing of the power conversion apparatus shown in FIG. 4.

FIG. 6 shows connection surface F2 of DC connector 103 at second end E2 of housing 101. Although FIG. 6 shows a DC connector for the CHAdeMO method by way of example, the technique of the present disclosure is also applicable to a connector for another method (e.g., the CCS method, the GB/T method or the Tesla method).

Referring to FIG. 6 together with FIG. 4, terminals T41 and T42 of DC connector 103 are power terminals (a P (positive) terminal/an N (negative) terminal) from which DC power is output. Terminal T43 is a ground terminal and is electrically connected to the ground line in housing 101. Terminal group T44 includes a plurality of signal terminals. Terminal group T44 includes a CAN (Controller Area Network) signal terminal and a CNCT signal terminal (a terminal for checking connector connection).

Referring to FIGS. 1 and 4, terminals T41 to T43 and terminal group T44 of DC connector 103 correspond to terminals T51 to T53 and terminal group T54 of DC inlet 210 of vehicle 200, respectively. In a state (fitted state) where DC connector 103 is connected to DC inlet 210, terminals T41 to T43 of DC connector 103 are connected to terminals T51 to T53 of DC inlet 210, respectively. Each terminal included in terminal group T44 is also connected to the corresponding terminal of terminal group T54. When DC connector 103 is connected to DC inlet 210, controller 111 of power conversion apparatus 100 and vehicle ECU 250 of vehicle 200 are connected to be communicable with each other.

Power conversion apparatus 100 shown in FIG. 4 is configured to perform AC/DC conversion (conversion from AC to DC) of AC power input from AC inlet 102 and output DC power to DC connector 103. The AC power input to terminals T31 and T32 of AC inlet 102 is output to terminals T41 and T42 of DC connector 103 through AC-side sensor 112, power conversion circuit PC1 (PFC circuit 113, insulating circuit 114, cut-off switches 131 and 132, and rectifier circuit 115), and DC-side sensor 116.

AC-side sensor 112 is arranged between terminals T31 and T32 of AC inlet 102 and PFC circuit 113. AC-side sensor 112 includes a voltage sensor configured to detect a voltage of the electric power input to AC inlet 102, and a current sensor configured to detect a current flowing between AC inlet 102 and PFC circuit 113.

PFC circuit 113 is configured to convert an AC voltage input from the AC inlet 102 side into a DC voltage and further convert the DC voltage into a high-frequency AC voltage. As a result of this power conversion, a current waveform becomes close to a sinusoidal wave having the same phase as a voltage waveform and a power factor is improved. A known PFC circuit may be used as PFC circuit 113. A specific example of a configuration of PFC circuit 113 will be described below (see FIG. 7).

Insulating circuit 114 is located between PFC circuit 113 and rectifier circuit 115. Insulating circuit 114 is configured to electrically insulate the circuit on the AC inlet 102 side from the circuit on the DC connector 103 side. A known insulating circuit may be used as insulating circuit 114. In the present embodiment, an insulating transformer is used as insulating circuit 114. Transmission of electric power in insulating circuit 114 is performed using a voltage, not a current. A specific example of a configuration of insulating circuit 114 will be described below (see FIG. 7).

Insulating circuit 114 boosts the AC voltage input from the AC inlet 102 side and applies the boosted AC voltage to the circuit on the DC connector 103 side. As a result of the application of the voltage, the current flows through the circuit located on the DC connector 103 side relative to insulating circuit 114. The AC power output from insulating circuit 114 to the DC connector 103 side is supplied to rectifier circuit 115 through cut-off switches 131 and 132.

Cut-off switches 131 and 132 are arranged between insulating circuit 114 and rectifier circuit 115. Cut-off switches 131 and 132 are configured to switch conduction and cut-off of the current between insulating circuit 114 and rectifier circuit 115. A state (closed state/open state) of cut-off switches 131 and 132 is controlled by controller 111. When cut-off switches 131 and 132 are in the closed state (conducting state), flow of the current from insulating circuit 114 to rectifier circuit 115 is permitted. When cut-off switches 131 and 132 are in the open state (cut-off state), flow of the current from insulating circuit 114 to rectifier circuit 115 is prohibited. Cut-off switches 131 and 132 according to the present embodiment correspond to one example of "first switch" according to the present disclosure.

Rectifier circuit 115 is located on the DC connector 103 side relative to insulating circuit 114 and configured to convert the AC power supplied from insulating circuit 114 into DC power. A known rectifier circuit may be used as rectifier circuit 115. A specific example of a configuration of rectifier circuit 115 will be described below (see FIG. 7).

DC-side sensor 116 is arranged between rectifier circuit 115 and terminals T41 and T42 of DC connector 103. DC-side sensor 116 includes a voltage sensor configured to detect a voltage of the electric power output to DC connector 103, and a current sensor configured to detect a current between rectifier circuit 115 and DC connector 103. Rectifier circuit 115 and the current sensor of DC-side sensor 116 according to the present embodiment correspond to one example of "first power conversion circuit" and "first current sensor" according to the present disclosure, respectively.

Figure 7:
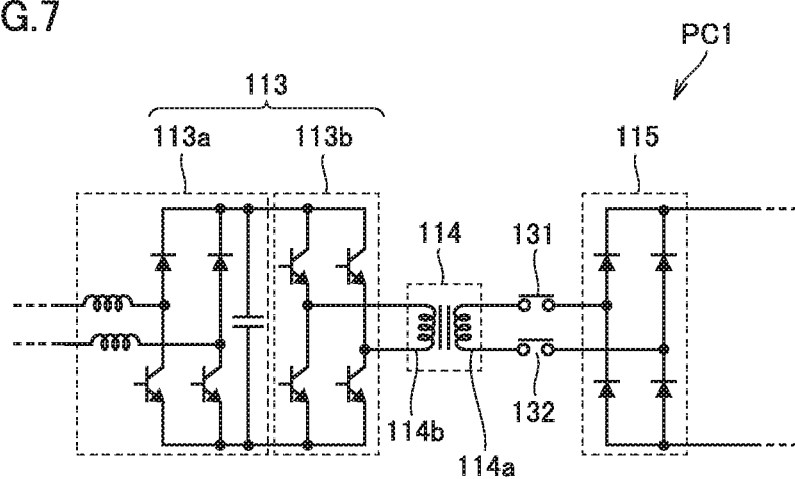
FIG. 7 shows details of a power conversion circuit shown in FIG. 4.

FIG. 7 shows details of power conversion circuit PC1. Referring to FIG. 7 together with FIG. 4, PFC circuit 113 includes a rectifier circuit 113a and an inverter 113b. Insulating circuit 114 is an insulating transformer including a first coil 114a and a second coil 114b.

Rectifier circuit 113a is configured to rectify and boost the input AC power. More specifically, rectifier circuit 113a includes two pairs of upper and lower arms, two reactors and one smoothing capacitor. In each pair of upper and lower arms, the upper arm includes a diode and the lower arm includes a switching element. The switching element of the lower arm is controlled by controller 111. Each switching element included in rectifier circuit 113a is controlled by controller 111, and thus, rectifier circuit 113a functions as a boosting chopper circuit.

Inverter 113b is a full-bridge circuit including four switching elements. Each switching element is controlled by controller 111. Each switching element included in inverter 113b is controlled by controller 111 and the DC power input from rectifier circuit 113a to inverter 113b is thereby converted into high-frequency AC power.

In insulating circuit 114, second coil 114b is located on the AC inlet 102 side (PFC circuit 113 side) relative to first coil 114a. Rectifier circuit 115 is connected to first coil 114a of insulating circuit 114 with cut-off switches 131 and 132 being interposed, and PFC circuit 113 is connected to second coil 114b of insulating circuit 114 through an electric line. First coil 114a and second coil 114b are electrically insulated from each other. An electric power path on the AC inlet 102 side (PFC circuit 113 side) relative to second coil 114b and an electric power path on the DC connector 103 side (rectifier circuit 115 side) relative to first coil 114a are electrically insulated from each other by insulating circuit 114. Insulating circuit 114 boosts the AC voltage applied to second coil 114b and outputs the boosted AC voltage to first coil 114a.

Each of cut-off switches 131 and 132 is connected in series to first coil 114a, and configured to switch conduction and cut-off of the current flowing through first coil 114a. An electromagnetic mechanical relay can, for example, be used as cut-off switches 131 and 132. However, a semiconductor relay that is also referred to as "SSR (Solid State Relay)" may be used as cut-off switches 131 and 132. Examples of the semiconductor relay include a relay formed of a thyristor, a triac or a transistor (such as an IGBT, a MOSFET or a bipolar transistor).

Rectifier circuit 115 is a diode bridge circuit including four diodes. Rectifier circuit 115 is configured to convert the AC power supplied from first coil 114a of insulating circuit 114 into DC power.

Referring again to FIG. 4, when AC power is input to terminals T31 and T32 of AC inlet 102 in power conversion apparatus 100, DC power is generated by power conversion circuit PC1 and the generated DC power is output to terminals T41 and T42 of DC connector 103. At this time, a current flowing between AC inlet 102 and PFC circuit 113 is detected by AC-side sensor 112, and a current flowing between rectifier circuit 115 and DC connector 103 is detected by DC-side sensor 116. A result of detection by each of AC-side sensor 112 and DC-side sensor 116 is input to controller 111.

Controller 111 includes a processor, a memory device and an input/output port (all are not shown). A CPU (Central Processing Unit) can, for example, be used as the processor. The memory device includes a RAM (Random Access Memory) configured to temporarily store data, and a storage (e.g., a ROM (Read Only Memory) and a rewritable non-volatile memory) configured to save various types of information. In addition to programs used in various types of control, various parameters used in the programs are also prestored in the storage. The processor executes the programs stored in the memory device and the various types of control are thereby performed. The various types of control can be processed not only by software but also by dedicated hardware (electronic circuit).

Power supply circuit 120 is configured to generate driving power of controller 111 (i.e., electric power for operating controller 111) using electric power supplied from a prescribed power supply, and supply the generated driving power to controller 111. Power supply circuit 120 may generate the driving power of controller 111 using electric power of a battery (not shown) in housing 101, or may generate the driving power of controller 111 using electric power flowing between AC inlet 102 and DC connector 103 (more particularly, between terminals T31 and T32 and terminals T41 and T42).

Controller 111 according to the present embodiment includes a charging control unit 11 and a cut-off control unit 12. Charging control unit 11 and cut-off control unit 12 are implemented, for example, by a processor and a program executed by the processor. In the present embodiment, cut-off switches 131 and 132, the current sensor of DC-side sensor 116, and controller 111 form one example of "interrupter" according to the present disclosure. The interrupter according to the present embodiment is housed in housing 101.

Charging control unit 11 is configured to control charging power of battery 240 (vehicle-mounted battery). More specifically, charging control unit 11 is configured to control PFC circuit 113 based on the result of detection by each of AC-side sensor 112 and DC-side sensor 116, to thereby control output power of power conversion apparatus 100 (and further, charging power of battery 240).

Cut-off control unit 12 is configured to cut off a current between AC inlet 102 and DC connector 103, when an abnormality of the current is detected between AC inlet 102 and DC connector 103. More specifically, cut-off control unit 12 is configured to bring cut-off switches 131 and 132 into the open state to thereby cut off the current, when the abnormality of the current (e.g., electric leakage or overcurrent) is detected by the current sensor of DC-side sensor 116 while electric power is being input to AC inlet 102 (e.g., while electric power is being supplied from power feeding facility 300 shown in FIG. 1 through power conversion apparatus 100 to vehicle 200). Cut-off control unit 12 may determine that the abnormality of the current (more particularly, electric leakage) occurs, when an equilibrium state of the current flowing through terminals T141 and T42 (the P terminal and the N terminal) is disturbed. Alternatively, cut-off control unit 12 may determine that the abnormality of the current (more particularly, overcurrent) occurs, when the excessive current is detected in one of terminals T41 and T42 (the P terminal and the N terminal).

As described above, power conversion apparatus 100 according to the present embodiment includes DC connector 103 connectable to DC inlet 210 (inlet for DC power) of vehicle 200, AC inlet 102 connectable to AC connector 323 of charging cable 320 (cable for AC power), and rectifier circuit 115 (first power conversion circuit) located between AC inlet 102 and DC connector 103. Rectifier circuit 115 is configured to convert AC power input from the AC inlet 102 side into DC power and output the DC power to the DC connector 103 side. By using power conversion apparatus 100 configured as described above, the AC power supplied from power feeding facility 300 for the AC method can be converted into the DC power and the DC power can be supplied to vehicle 200. Therefore, according to above-described power conversion apparatus 100, vehicle 200 including only the DC inlet can be supplied with the electric power from power feeding facility 300.

Figure 8:
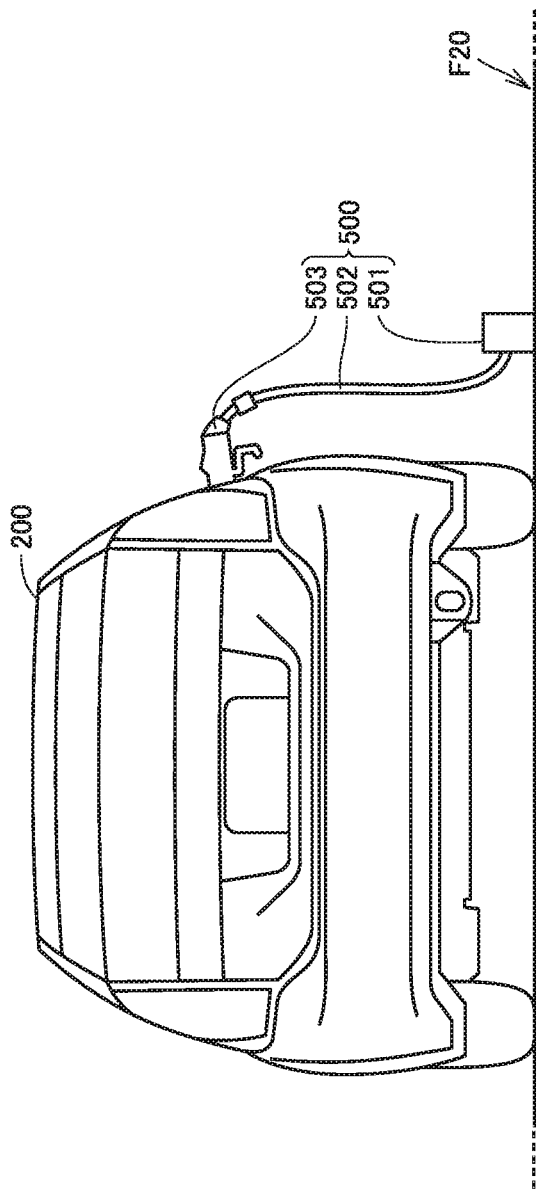
FIG. 8 is a diagram for illustrating a problem that may arise in a power conversion apparatus according to a comparative example.

It is conceivable to modify the configuration of above-described power conversion apparatus 100 such that power conversion circuit PC1 and DC connector 103 are provided in separate housings. However, in a power conversion apparatus configured as described above (hereinafter, also referred to as "power conversion apparatus according to a comparative example"), a problem described below may arise. FIG. 8 is a diagram for illustrating the problem that may arise in the power conversion apparatus according to the comparative example.

Referring to FIG. 8, a power conversion apparatus 500 according to the comparative example includes an AC inlet 501, a cable 502 and a DC connector 503. A housing of AC inlet 501 is connected to a housing of DC connector 503 through a cable 502. Cable 502 is a known flexible cable used in a general charging cable. Above-described power conversion circuit PC1 (see FIG. 7) is housed in the housing of AC inlet 501. AC inlet 501 and DC connector 503 are electrically connected to each other through an electric line in cable 502.

In above-described power conversion apparatus 500, AC inlet 501 having power conversion circuit PC1 built thereinto is heavy. Therefore, stress is likely to be applied to cable 502 due to a weight of AC inlet 501. In addition, flexible cable 502 is used, and thus, torsion is likely to occur in cable 502. Furthermore, in the example of FIG. 8, heavy AC inlet 501 is placed on ground surface F20. Therefore, submersion of AC inlet 501 in water is likely to occur.

In contrast, in power conversion apparatus 100 according to the present embodiment, AC inlet 102, DC connector 103 and power conversion circuit PC1 are provided in single housing 101 and thereby integrated as shown in FIGS. 3 and 4. Therefore, by connecting DC connector 103 of power conversion apparatus 100 to DC inlet 210 of vehicle 200, power conversion apparatus 100 as a whole can be supported by vehicle 200. Therefore, stress is reduced as compared with the above-described comparative example in which the flexible cable is used, and thus, the durability of power conversion apparatus 100 is enhanced. In addition, power conversion apparatus 100 according to the present embodiment is held at a position higher than ground surface F20 (see FIG. 3). Therefore, submersion of power conversion apparatus 100 in water is easily avoided.

In power conversion apparatus 100 according to the present embodiment, power conversion circuit PC1 housed in housing 101 includes insulating circuit 114 located between AC inlet 102 and DC connector 103 (see FIG. 4). Controller 111 is configured to bring cut-off switches 131 and 132 into the open state to thereby cut off a current, when an abnormality of the current is detected by DC-side sensor 116 while electric power is being input to AC inlet 102. In power conversion apparatus 100 configured as described above, the circuit on the AC inlet 102 side and the circuit on the DC connector 103 side are electrically insulated by insulating circuit 114. Therefore, even when an overcurrent occurs in the circuit on the AC inlet 102 side relative to insulating circuit 114, the overcurrent does not flow into the circuit on the DC connector 103 side relative to insulating circuit 114. In addition, when the abnormality of the current is detected, controller 111 causes cut-off switches 131 and 132 to cut off the current. Therefore, even when an abnormality of the current occurs during charging of battery 240, for example, the circuit on the power reception side (e.g., the electronic circuit of vehicle 200) can be appropriately protected.

In power conversion apparatus 100 according to the present embodiment, each of cut-off switches 131 and 132 is connected in series to first coil 114a of insulating circuit 114 (more particularly, an insulating transformer), and configured to switch conduction and cut-off of a current flowing through first coil 114a. In above-described power conversion apparatus 100, when an abnormal current is detected, the current can be cut off in the vicinity of insulating circuit 114. Insulation is performed by both insulating circuit 114 and cut-off switches 131 and 132, and thus, the circuit on the power reception side is protected more reliably.

AC inlet 102 of power conversion apparatus 100 according to the present embodiment includes terminals T31 and T32 (power terminal) connectable to a power line of charging cable 320, terminal T35 (CPLT signal terminal) connectable to a CPLT signal line of charging cable 320, and terminal T33 (ground terminal) connectable to a ground line of charging cable 320. According to above-described power conversion apparatus 100, battery 240 can be appropriately charged.

Second Embodiment

A power conversion apparatus according to a second embodiment of the present disclosure will be described. The power conversion apparatus according to the second embodiment is also applicable to the power feeding system shown in FIG. 1, for example. Since the second embodiment has many features common to those of the first embodiment, differences will be mainly described and description of the common features will not be repeated.

Figure 9:
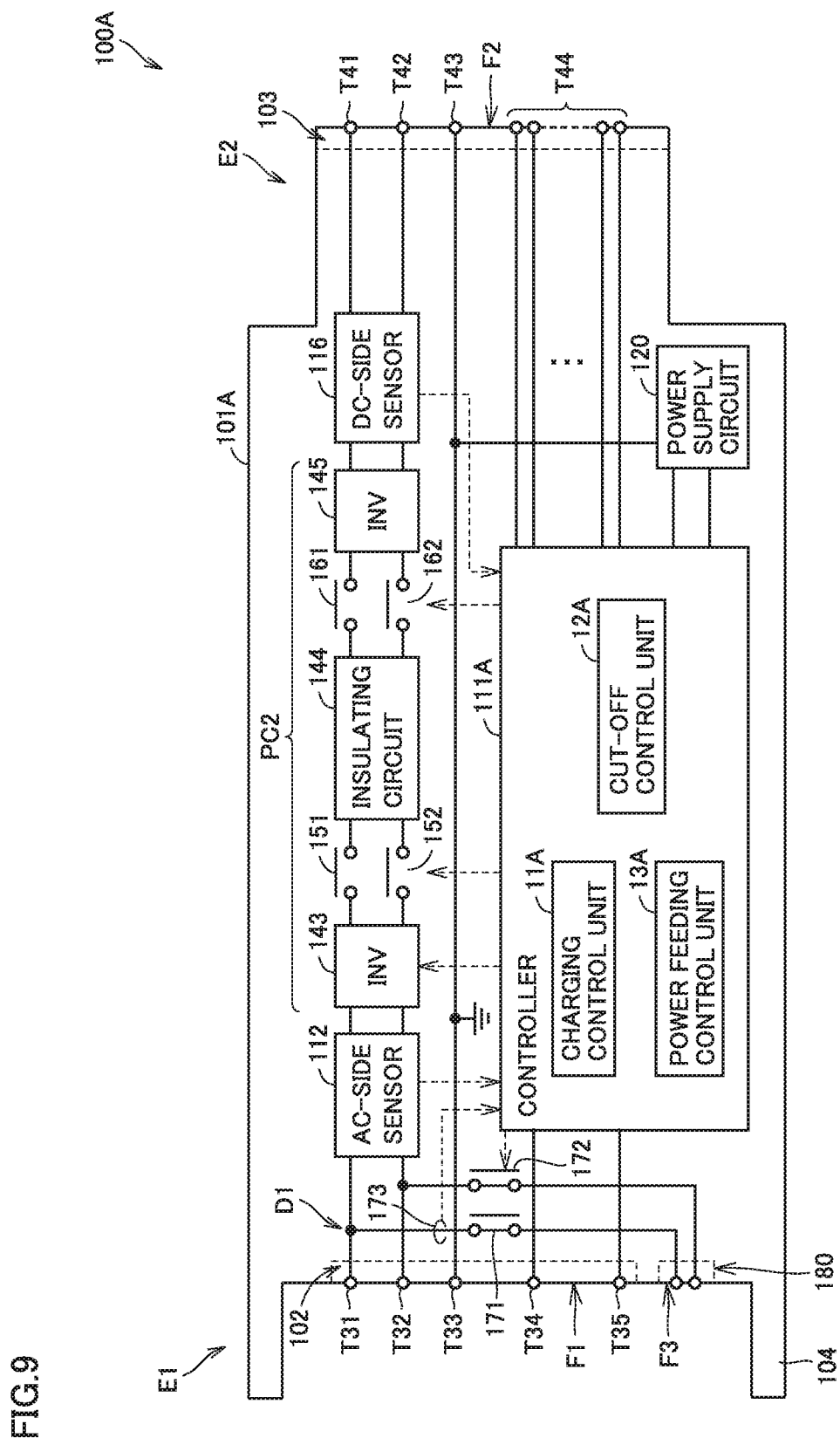
FIG. 9 shows a configuration of a power conversion apparatus according to a second embodiment of the present disclosure.

FIG. 9 shows a configuration of the power conversion apparatus according to the second embodiment of the present disclosure. Referring to FIG. 9, a power conversion apparatus 100A according to the second embodiment basically has a configuration equivalent to that of power conversion apparatus 100 (see FIG. 4) according to the first embodiment. However, power conversion apparatus 100A includes a housing 101A, instead of housing 101. Housing 101A houses a power conversion circuit PC2 and a controller 111A, instead of power conversion circuit PC1 and controller 111 in housing 101. Housing 101A further includes switches 171 and 172, a current sensor 173 and an electrical outlet 180.

Power conversion apparatus 100A is configured to, when AC power is input to AC inlet 102, perform AC/DC conversion (conversion from AC to DC) of the input AC power and output DC power to DC connector 103. Power conversion apparatus 100A is also configured to, when DC power is input to DC connector 103, perform DC/AC conversion (conversion from DC to AC) of the input DC power and output AC power to AC inlet 102. Power conversion circuit PC2 in power conversion apparatus 100A is configured to perform bidirectional power conversion.

Power conversion circuit PC2 includes an inverter 143, cut-off switches 151 and 152, an insulating circuit 144, cut-off switches 161 and 162, and an inverter 145. Power conversion circuit PC2 functions as a bidirectional converter. A specific example of a configuration of power conversion circuit PC2 will be described below (see FIG. 10). In power conversion apparatus 100A, AC-side sensor 112 is provided on the AC inlet 102 side of power conversion circuit PC2, and DC-side sensor 116 is provided on the DC connector 103 side of power conversion circuit PC2. Configurations of AC-side sensor 112 and DC-side sensor 116 are the same as those of the first embodiment, for example. Inverter 145 and the current sensor of DC-side sensor 116 according to the present embodiment correspond to one example of "first power conversion circuit" and "first current sensor" according to the present disclosure, respectively. In addition, inverter 143 and the current sensor of AC-side sensor 112 according to the present embodiment correspond to one example of "second power conversion circuit" and "second current sensor" according to the present disclosure, respectively.

Cut-off switches 151 and 152 are arranged between inverter 143 and insulating circuit 144. Cut-off switches 151 and 152 are configured to switch conduction and cut-off of a current between inverter 143 and insulating circuit 144. A state (closed state/open state) of cut-off switches 151 and 152 is controlled by controller 111A. When cut-off switches 151 and 152 are in the closed state (conducting state), a current path connecting inverter 143 and insulating circuit 144 is connected. When cut-off switches 151 and 152 are in the open state (cut-off state), the current path connecting inverter 143 and insulating circuit 144 is cut off. Cut-off switches 151 and 152 according to the present embodiment correspond to one example of "second switch" according to the present disclosure.

Cut-off switches 161 and 162 are arranged between insulating circuit 144 and inverter 145. Cut-off switches 161 and 162 are configured to switch conduction and cut-off of a current between insulating circuit 144 and inverter 145. A state (closed state/open state) of cut-off switches 161 and 162 is controlled by controller 111A. When cut-off switches 161 and 162 are in the closed state (conducting state), a current path connecting insulating circuit 144 and inverter 145 is connected. When cut-off switches 161 and 162 are in the open state (cut-off state), the current path connecting insulating circuit 144 and inverter 145 is cut off. Cut-off switches 161 and 162 according to the present embodiment correspond to one example of "first switch" according to the present disclosure.

Figure 10:
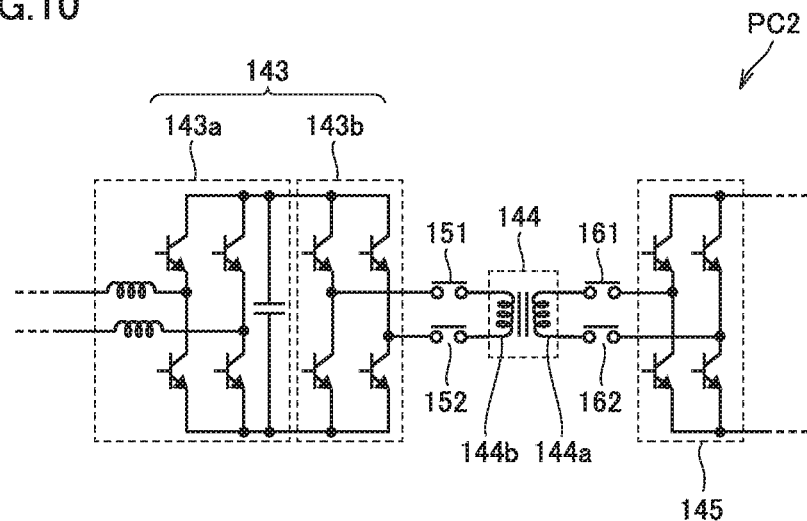
FIG. 10 shows details of a power conversion circuit shown in FIG. 9.

FIG. 10 shows details of power conversion circuit PC2. Referring to FIG. 10 together with FIG. 9, inverter 143 includes a first inverter 143a and a second inverter 143b. First inverter 143a includes a full bridge circuit including four switching elements, two reactors, and one smoothing capacitor. Second inverter 143b is a full bridge circuit including four switching elements. Inverter 145 is also a full bridge circuit including four switching elements. Each of the switching elements included in inverters 143 and 145 is controlled by controller 111A.

Insulating circuit 144 is an insulating transformer including a first coil 144a and a second coil 144b. Second coil 144b is located on the AC inlet 102 side (inverter 143 side) relative to first coil 144a. Inverter 143 is connected to second coil 144b of insulating circuit 144 with cut-off switches 151 and 152 being interposed, and inverter 145 is connected to first coil 144a of insulating circuit 144 with cut-off switches 161 and 162 being interposed. First coil 144a and second coil 144b are electrically insulated from each other. An electric power path on the AC inlet 102 side (inverter 143 side) relative to second coil 144b and an electric power path on the DC connector 103 side (inverter 145 side) relative to first coil 144a are electrically insulated by insulating circuit 144.

Each of cut-off switches 151 and 152 is connected in series to second coil 144b, and configured to switch conduction and cut-off of a current flowing through second coil 144b. Each of cut-off switches 161 and 162 is connected in series to first coil 144a, and configured to switch conduction and cut-off of a current flowing through first coil 144a. An electromagnetic mechanical relay can, for example, be used as cut-off switches 151, 152, 161, and 162. However, cut-off switches 151, 152, 161, and 162 are not limited thereto, and a semiconductor relay may be used as cut-off switches 151, 152, 161, and 162.

Referring again to FIG. 9, electrical outlet 180 is an electrical outlet configured to output AC power generated through power conversion circuit PC2 from DC power input to DC connector 103. Electrical outlet 180 is connected to terminals T31 and T32 with switches 171 and 172 being interposed. A state (closed state/open state) of switches 171 and 172 is controlled by controller 111A. Current sensor 173 is provided between terminal T31 and switch 171. Current sensor 173 is configured to measure a current of electrical outlet 180. A result of detection by current sensor 173 is output to controller 111A. When above-described switches 171 and 172 are in the closed state (conducting state), electric power that is the same as electric power output to terminals T31 and T32 is output to electrical outlet 180. When switches 171 and 172 are in the open state (cut-off state), the electric power is not output to electrical outlet 180. In the example of FIG. 9, current sensor 173 is provided on the switch 171 side relative to a branch point D1. However, current sensor 173 may be provided on the terminal T31 side relative to branch point D1.

In the power conversion apparatus according to the present embodiment, AC inlet 102, DC connector 103, power conversion circuit PC2, and electrical outlet 180 are provided in single housing 101A and thereby integrated. Electrical outlet 180 is exposed at an end face of housing 101A on the AC inlet 102 side. In addition, first end E1 of housing 101A on the AC inlet 102 side includes skirt portion 104 protruding around connection surface F1 of AC inlet 102. In the present embodiment, a region surrounded by skirt portion 104 includes not only connection surface F1 of AC inlet 102 but also a connection surface F3 of electrical outlet 180.

Figure 11:
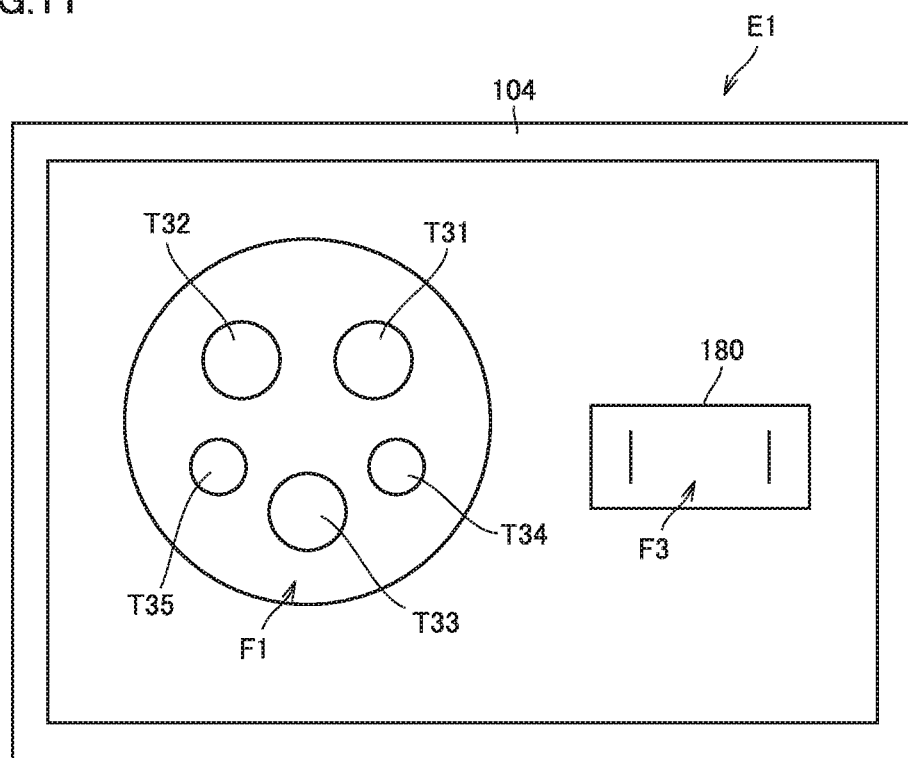
FIG. 11 shows an end face of a first end of a housing at which an AC inlet and an electrical outlet are exposed, in the power conversion apparatus according to the second embodiment of the present disclosure.

FIG. 11 shows an end face of first end E1 of housing 101A at which AC inlet 102 and electrical outlet 180 are exposed. In the example of FIG. 11, the end face (more particularly, the end face including connection surfaces F1 and F3) of first end E1 is formed to have a rectangular shape. However, the shape of the end face of first end E1 is not limited to the rectangular shape, and may be an elliptical shape or a circular shape.

Referring to FIG. 11, connection surface F1 of AC inlet 102 and connection surface F3 of electrical outlet 180 are exposed at the surface of housing 101A such that external terminals can be connected to connection surface F1 of AC inlet 102 and connection surface F3 of electrical outlet 180, and are surrounded by skirt portion 104. Skirt portion 104 is configured to protrude toward the tip side (X2 side in the DC connected state shown in FIG. 3) around connection surfaces F1 and F3. A part of skirt portion 104 is located on connection surfaces F1 and F3, and can function as a roof member for connection surfaces F1 and F3. Skirt portion 104 serves to protect connection surfaces F1 and F3 from rain, snow and wind (and further, a foreign object blown by the wind).

Referring again to FIG. 9, controller 111A has the same hardware configuration as that of controller 111 in the first embodiment. That is, controller 111A also includes a processor and a memory device (both are not shown). However, programs different from those of controller 111 are stored in the memory device of controller 111A, and controller 111A is configured to perform a process different from that of controller 111. Controller 111A includes a charging control unit 11A, a cut-off control unit 12A and a power feeding control unit 13A. Charging control unit 11A, cut-off control unit 12A and power feeding control unit 13A are implemented, for example, by a processor and a program executed by the processor. In the present embodiment, cut-off switches 151, 152, 161, and 162, the current sensor of AC-side sensor 112, the current sensor of DC-side sensor 116, and controller 111A form one example of "interrupter" according to the present disclosure. The interrupter according to the present embodiment is housed in housing 101A.

Charging control unit 11A is configured to control charging power of battery 240 (vehicle-mounted battery) shown in FIG. 1, for example. When electric power is input to AC inlet 102 (e.g., when electric power is supplied from power feeding facility 300 through power conversion apparatus 100A to vehicle 200 in the power feeding system shown in FIG. 1), power conversion circuit PC2 shown in FIG. 10 operates as follows.

Referring to FIG. 10 together with FIG. 9, first inverter 143a rectifies AC power input from AC inlet 102 and outputs the rectified AC power to second inverter 143b, and second inverter 143b converts DC power received from first inverter 143a into high-frequency AC power. Insulating circuit 144 transmits the output (AC power) of second inverter 143b to inverter 145, and inverter 145 rectifies the AC power received from insulating circuit 144 and outputs the rectified AC power to DC connector 103. Charging control unit 11A is configured to control inverters 143 and 145 based on a result of detection by each of AC-side sensor 112 and DC-side sensor 116, to thereby control output power of power conversion apparatus 100A (and further, charging power of battery 240).

Referring again to FIG. 9, cut-off control unit 12A is configured to bring cut-off switches 161 and 162 into the open state, when an abnormality of the current (e.g., electric leakage or overcurrent) is detected by the current sensor of DC-side sensor 116 while the electric power is being input to AC inlet 102 as described above. Therefore, the circuit on the power reception side (e.g., the electronic circuit of the vehicle) can be protected when the abnormality of the current occurs.

Power feeding control unit 13A is configured to, when electric power of vehicle 200 shown in FIG. 1 (e.g., electric power stored in the vehicle-mounted battery or electric power generated in vehicle 200) is, for example, fed to the outside of the vehicle, control the fed electric power. Power feeding control unit 13A is configured to bring switches 171 and 172 into the closed state when power feeding to the outside of the vehicle starts (e.g., when a prescribed start condition is satisfied), and return switches 171 and 172 to the open state when power feeding to the outside of the vehicle ends (e.g., when a prescribed end condition is satisfied). When electric power is input to DC connector 103 (e.g., when electric power is supplied from vehicle 200 through power conversion apparatus 100A to the outside of the vehicle in the power feeding system shown in FIG. 1), power conversion circuit PC2 shown in FIG. 10 operates as follows.

Referring to FIG. 10 together with FIG. 9, inverter 145 converts DC power input from DC connector 103 into high-frequency AC power and outputs the high-frequency AC power to insulating circuit 144. Insulating circuit 144 transmits the output (AC power) of inverter 145 to second inverter 143b, and second inverter 143b rectifies the AC power received from insulating circuit 144 and outputs the rectified AC power to first inverter 143a. First inverter 143a converts the DC power received from second inverter 143b into AC power and outputs the AC power to AC inlet 102 and electrical outlet 180. As a result, the electric power output from AC inlet 102 and electrical outlet 180 can be supplied to an electrical load (not shown). When a plug connecting to the electrical load is connected to electrical outlet 180 or when an AC connector connecting to the electrical load is connected to AC inlet 102, the electric power of the vehicle can be supplied to the electrical load. Examples of the electrical load include a V2H (Vehicle to Home) stand, an electric appliance (e.g., a cooker and lighting equipment used outdoors), and a power storage device of another vehicle.

Referring again to FIG. 9, cut-off control unit 12A is configured to bring cut-off switches 151 and 152 into the open state, when an abnormality of the current (e.g., electric leakage or overcurrent) is detected by the current sensor of AC-side sensor 112 while the electric power is being input to DC connector 103 as described above. Therefore, the circuit on the power reception side (e.g., the electronic circuit of the electrical load) can be protected when the abnormality of the current occurs.

As described above, in power conversion apparatus 100A according to the present embodiment as well, the AC power supplied from the power feeding facility for the AC method can be converted into the DC power and the DC power can be supplied to the vehicle. Furthermore, in power conversion apparatus 100A according to the present embodiment, the AC power can also be supplied from the vehicle through power conversion apparatus 100A to the outside of the vehicle.

OTHER EMBODIMENTS

Each of above-described housings 101 and 101A has a straight shape, and DC connector 103 is formed at one end (X1 side in the DC connected state shown in FIG. 3) of each of housings 101 and 101A and AC inlet 102 is formed on the opposite side (X2 side in the DC connected state shown in FIG. 3). However, the shape of each of housings 101 and 101A is not limited to such a shape and can be changed as appropriate. As in a first modification described below, a body portion of a housing of a power conversion apparatus may be curved.

Figure 12:
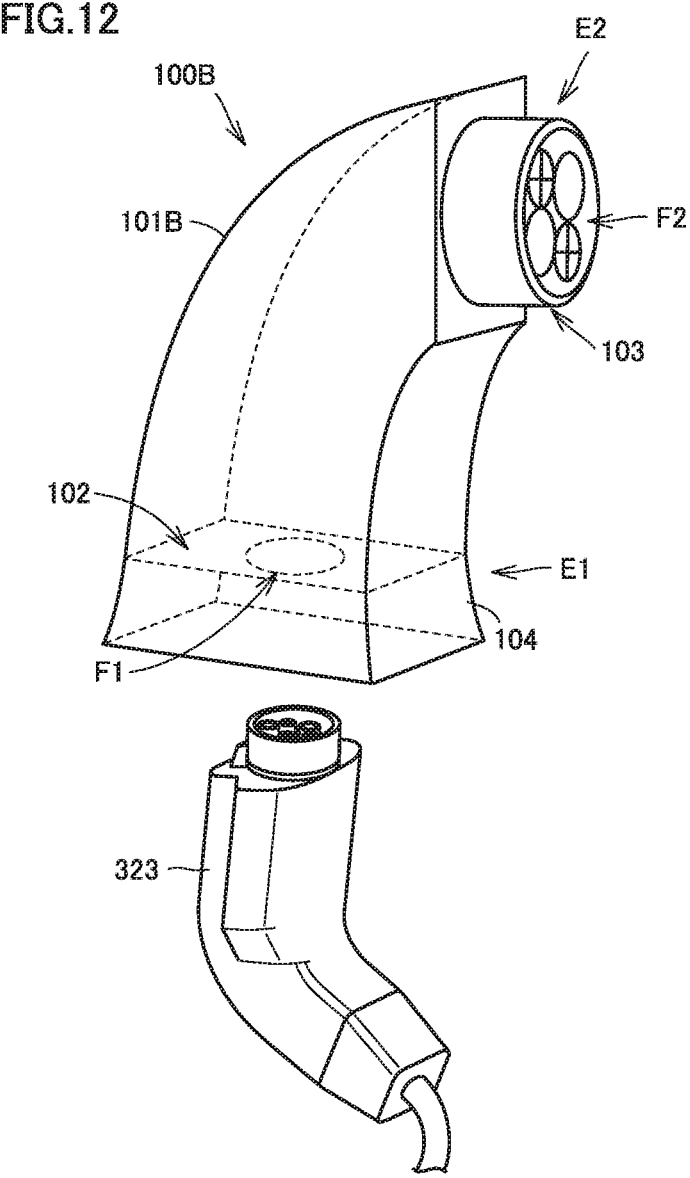
FIG. 12 shows an appearance of a power conversion apparatus according to a first modification.
Figure 13:
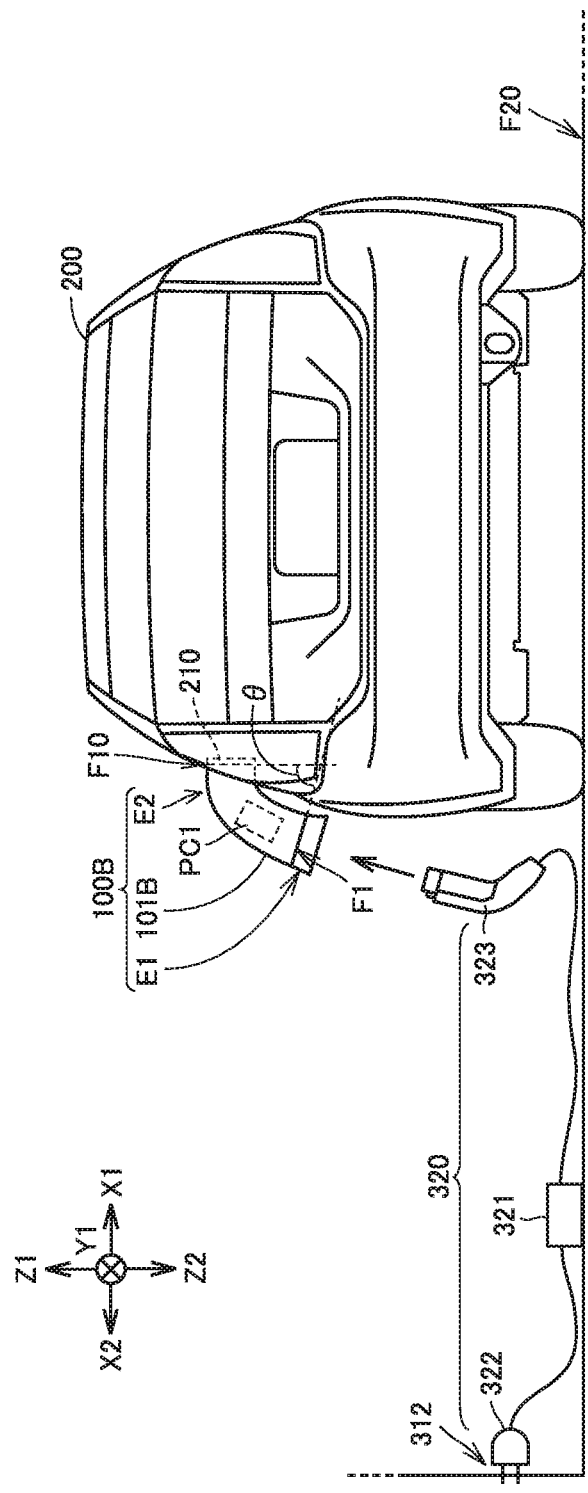
FIG. 13 shows a state in which the power conversion apparatus shown in FIG. 12 is connected to a vehicle.

FIG. 12 shows an appearance of a power conversion apparatus according to the first modification. FIG. 13 shows a state in which the power conversion apparatus according to the first modification is connected to vehicle 200.

Referring to FIGS. 12 and 13, in a power conversion apparatus 100B according to the first modification, a body portion of a housing 101B is curved. Therefore, in the DC connected state, connection surface F1 of AC inlet 102 faces a downward direction, and connection surface F2 of DC connector 103 faces a direction of arrow X1. Connection surfaces F1 and F2 are exposed at a surface of housing 101B such that external terminals can be connected to connection surfaces F1 and F2. Since connection surface F1 of AC inlet 102 faces the downward direction, connection surface F1 of AC inlet 102 is not easily wetted with rain when it rains. When it snows, accumulation of snow on connection surface F1 of AC inlet 102 is easily avoided. "Facing the downward direction" means facing downward relative to the side (horizontal). That is, "facing the downward direction" includes not only facing a vertically downward direction but also facing a diagonally downward direction inclined with respect to the vertical direction.

Power conversion apparatus 100B according to the first modification is configured such that connection surface F1 of AC inlet 102 is inclined with respect to a fitting surface F10 between DC connector 103 and DC inlet 210, in a state where DC connector 103 is fitted into DC inlet 210. An angle θ formed by fitting surface F10 and connection surface F1 of AC inlet 102 is greater than 00 and smaller than 90°. Connection surface F1 of AC inlet 102 faces opposite to vehicle 200. With such a configuration, the user can easily see connection surface F1 of AC inlet 102. FIG. 13 shows the example in which connection surface F1 of AC inlet 102 faces the diagonally downward direction in the DC connected state. However, the direction of connection surface F1 of AC inlet 102 in the DC connected state may be a direction of arrow Z2 (vertically downward direction).

In power conversion apparatus 100B, power conversion circuit PC1 (see FIG. 7) is housed between first end E1 and second end E2 (i.e., the body portion) in housing 101B. In addition, in power conversion apparatus 100B, AC inlet 102 is located below (Z2 side) DC connector 103. As a result, AC connector 323 of charging cable 320 placed on ground surface F20 is easily connected to AC inlet 102.

Figure 14:
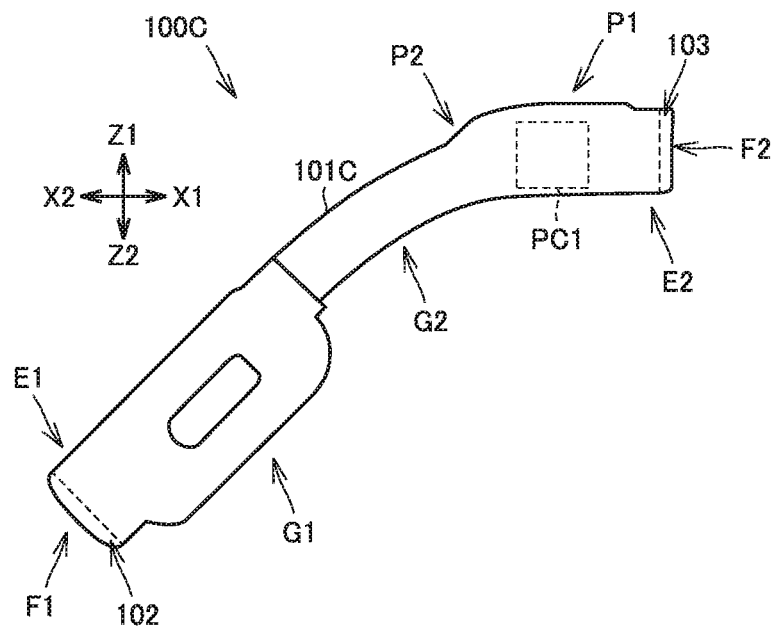
FIG. 14 shows an appearance of a power conversion apparatus according to a second modification.

FIG. 14 shows an appearance of a power conversion apparatus according to a second modification. Referring to FIG. 14, in a housing 101C of a power conversion apparatus 100C according to the second modification, a body portion of housing 101C is curved. Therefore, in the DC connected state, connection surface F1 of AC inlet 102 faces a downward direction (more particularly, a diagonally downward direction inclined with respect to a vertical direction), and connection surface F2 of DC connector 103 faces a direction of arrow X1. Connection surfaces F1 and F2 are exposed at a surface of housing 101C such that external terminals can be connected to connection surfaces F1 and F2. Since connection surface F1 of AC inlet 102 faces the downward direction, connection surface F1 of AC inlet 102 is not easily wetted with rain when it rains. In addition, since connection surface F1 of AC inlet 102 faces the diagonally downward direction inclined with respect to the vertical direction (Z axis) in the DC connected state of power conversion apparatus 100C, the user can see connection surface F1 more easily than the case in which connection surface F1 of AC inlet 102 faces the vertically downward direction, and thus, the charging cable is connected to AC inlet 102 more easily.

In addition, housing 101C has grip portions G1 and 02, a housing portion P1 and a stepped portion P2 between first end E1 and second end E2 (i.e., the body portion). Grip portion G1 is provided with a ring-shaped handle. Grip portion G2 is formed to have a rod (e.g., a circular cylindrical) shape. By holding grip portion G1 or G2, the user can easily carry power conversion apparatus 100C. Housing portion P1 is located on the second end E2 side of grip portion G2 and is formed to have a cylindrical (e.g., a circular cylindrical) shape thicker than grip portion G2. Power conversion circuit PC1 (see FIG. 7) is housed in housing portion P1. Stepped portion P2 is formed between housing portion P1 and grip portion G2. Using stepped portion P2, the user can push housing portion P1 and second end E2 toward the vehicle side. As a result, DC connector 103 is easily connected to the DC inlet of the vehicle. First end E1 of housing 101C may include a skirt portion.

In the first and second embodiments described above, skirt portion 104 formed around connection surface F1 of AC inlet 102 is used as a roof member for connection surface F1 of AC inlet 102 (see FIGS. 4 and 11). However, the roof member for connection surface F1 of AC inlet 102 is not limited to skirt portion 104.

Figure 15:
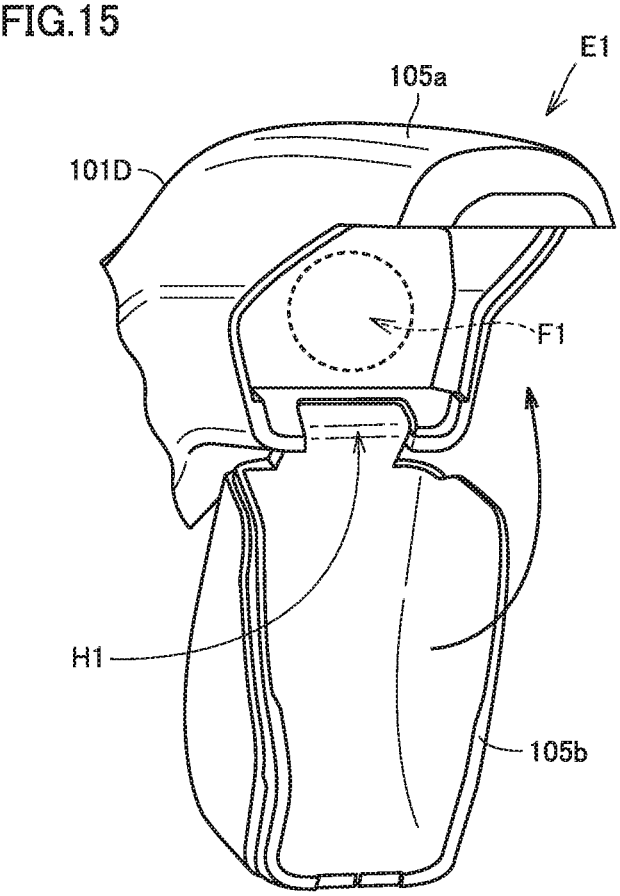
FIG. 15 is a diagram for illustrating a first modification of a roof member for the connection surface of the AC inlet.
Figure 16:
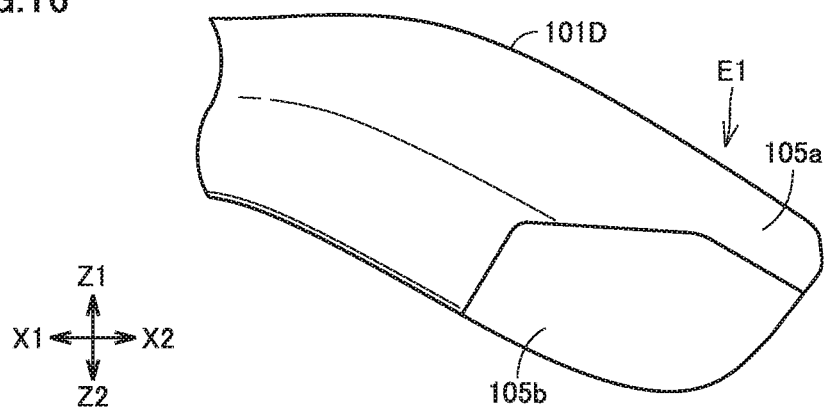
FIG. 16 shows a state in which a lower cover is closed in the example shown in FIG. 15.

FIG. 15 is a diagram for illustrating a first modification of the roof member for connection surface F1 of AC inlet 102. FIG. 16 shows a state in which a lower cover is closed in the example shown in FIG. 15.

Referring to FIG. 15, a housing 101D of a power conversion apparatus according to the present modification includes an upper cover 105a and a lower cover 105b at first end E1. Upper cover 105a and lower cover 105b at first end E1 are coupled to each other through a hinge H1. Lower cover 105b is configured to be openable and closable with respect to upper cover 105a as a result of rotation about hinge H1. A state shown in FIG. 15 is a state in which lower cover 105b is open. In this state, connection surface F1 of AC inlet 102 is exposed to the outside, and thus, an external terminal is easily connected to connection surface F1.

Referring to FIG. 16, when lower cover 105b is closed, connection surface F1 of AC inlet 102 is housed in housing 101D and is no longer exposed to the outside. In the state where lower cover 105b is closed, connection surface F1 of AC inlet 102 is covered with lower cover 105b, and thus, connection surface F1 is protected from rain, snow and wind (and further, a foreign object blown by the wind).

Referring to FIGS. 15 and 16, regardless of whether lower cover 105b is open or closed, upper cover 105a is located above connection surface F1 and functions as a roof member for connection surface F1. Because of upper cover 105a, connection surface F1 of AC inlet 102 is not easily wetted with rain.

Figure 17:
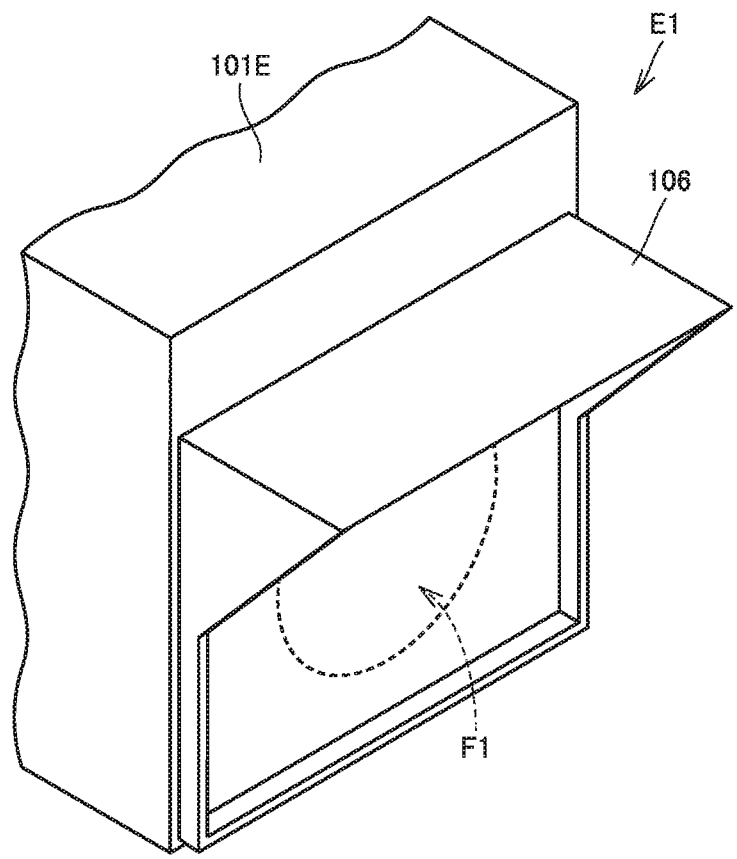
FIG. 17 is a diagram for illustrating a second modification of the roof member for the connection surface of the AC inlet.

FIG. 17 is a diagram for illustrating a second modification of the roof member for connection surface F1 of AC inlet 102.

Referring to FIG. 17, in a housing 101E of a power conversion apparatus according to the present modification, a roof member 106 for connection surface F1 of AC inlet 102 is provided at first end E1. Roof member 106 is fixed onto connection surface F1 and protrudes toward the tip side of first end E1. By providing such roof member 106, connection surface F1 of AC inlet 102 is not easily wetted with rain. In some embodiments, an amount of protrusion of roof member 106 is not less than 3 cm and not more than 20 cm, for example.

A member and/or a mechanism may be added to each above-described power conversion apparatus as needed. For example, a bracket (support member) may be provided at second end E2 of the power conversion apparatus so as to make it easier to support the power conversion apparatus by the vehicle. Alternatively, at least one of AC inlet 102 and DC connector 103 may be provided with a rotating mechanism so as to be able to change angles of connection surfaces F1 and F2. The number of each of AC inlet 102 and DC connector 103 is arbitrary as long as the number is one or more, and may be two or more. A size of the power conversion apparatus (and further, the housing) is also arbitrary. The power conversion apparatus may be a small-sized unit having a total length of less than 30 cm, or may be a large-sized unit having a total length exceeding 1 m, or may be a unit having a total length of not less than 30 cm and not more than 1 m. The power conversion apparatus may be mounted on a vehicle, or may be provided by an administrator of a power feeding facility.

In each modification described above, power conversion circuit PC2 may be used instead of power conversion circuit PC1. In addition, the embodiments and modifications described above may be implemented in combination.

While the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:
1. A power conversion apparatus comprising:
a housing including a DC connector and an AC inlet;
a first power conversion circuit housed in the housing;
an insulating circuit; and
an interrupter housed in the housing, the DC connector being connectable to an inlet for DC power of a vehicle, the AC inlet being connectable to a connector of a cable for AC power, the first power conversion circuit being located between the AC inlet and the DC connector, and configured to convert AC power input from the AC inlet side into DC power and output the DC power to the DC connector side, the insulating circuit is located between the AC inlet and the DC connector, and the interrupter is configured to interrupt a current between the AC inlet and the DC connector, when the interrupter detects an abnormality of the current between the AC inlet and the DC connector, wherein the first power conversion circuit is located on the DC connector side relative to the insulating circuit, the interrupter includes: a first switch configured to switch conduction and cut-off of a current between the insulating circuit and the DC connector; a first current sensor configured to detect a current flowing between the first power conversion circuit and the DC connector; and a first controller configured to control the first switch, and the first controller is configured to bring the first switch into an open state to thereby cut off the current, when the abnormality of the current is detected by the first current sensor while electric power is being input to the AC inlet.

2. The power conversion apparatus according to claim 1, wherein the AC inlet is located below the DC connector and above a ground contact surface of the vehicle, when the DC connector is connected to the inlet for DC power.

3. The power conversion apparatus according to claim 1, wherein a connection surface of the AC inlet is inclined with respect to a fitting surface between the DC connector and the inlet for DC power, when the DC connector is fitted into the inlet for DC power.

4. The power conversion apparatus according to claim 1, wherein the housing is configured to be supported by the vehicle in a state of floating from a ground, when the DC connector is connected to the inlet for DC power.

5. The power conversion apparatus according to claim 1, wherein an end of the housing on the AC inlet side includes a skirt portion protruding around a connection surface of the AC inlet.

6. The power conversion apparatus according to claim 1, wherein the housing includes a roof member for a connection surface of the AC inlet.

7. The power conversion apparatus according to claim 1, further comprising a second power conversion circuit housed in the housing, wherein the second power conversion circuit is located between the AC inlet and the insulating circuit, and configured to perform prescribed power conversion, and the interrupter includes:

a second switch configured to switch conduction and cut-off of a current between the AC inlet and the insulating circuit;

a second current sensor configured to detect a current flowing between the second power conversion circuit and the AC inlet; and a second controller configured to control the second switch, and the second controller is configured to bring the second switch into an open state to thereby cut off the current, when the abnormality of the current is detected by the second current sensor while electric power is being input to the DC connector.

8. The power conversion apparatus according to claim 1, wherein the first power conversion circuit is configured to convert DC power input from the DC connector side into AC power and output the AC power to the AC inlet side.

* * * * *